(12) United States Patent
Hashimoto et al.

(10) Patent No.: US 11,977,690 B2
(45) Date of Patent: *May 7, 2024

(54) ELECTRONIC PEN AND CORE BODY FOR ELECTRONIC PEN INCLUDING CONDUCTIVE CORE ROD AND PROTECTION MEMBER THAT COVERS CORE ROD

(71) Applicant: Wacom Co., Ltd., Saitama (JP)

(72) Inventors: Yoshiyuki Hashimoto, Saitama (JP); Shinya Aoki, Saitama (JP); Noboru Yamaguchi, Saitama (JP)

(73) Assignee: Wacom Co., Ltd., Saitama (JP)

( * ) Notice: Subject to any disclaimer, the term of this patent is extended or adjusted under 35 U.S.C. 154(b) by 0 days.

This patent is subject to a terminal disclaimer.

(21) Appl. No.: 18/063,603

(22) Filed: Dec. 8, 2022

(65) Prior Publication Data

US 2023/0108860 A1    Apr. 6, 2023

Related U.S. Application Data

(63) Continuation of application No. 17/118,214, filed on Dec. 10, 2020, now Pat. No. 11,537,220, which is a (Continued)

(30) Foreign Application Priority Data

Sep. 13, 2018 (JP) .................................. 2018-171125

(51) Int. Cl.
*G06F 3/0354* (2013.01)
*G06F 3/038* (2013.01)
(Continued)

(52) U.S. Cl.
CPC ........ *G06F 3/03545* (2013.01); *G06F 3/0383* (2013.01); *G06F 3/04162* (2019.05); *G06F 3/0442* (2019.05)

(58) Field of Classification Search
CPC ..... G06F 1/00; G06F 3/00; G06F 5/00; G06F 3/03545; G06F 3/0383; G06F 3/04162; G06F 3/0441; G06F 3/0442; G06F 3/046
See application file for complete search history.

(56) References Cited

U.S. PATENT DOCUMENTS 9,239,639 B1 * 1/2016 Vanderet ............. G06F 3/03545
9,612,671 B1 * 4/2017 Blaszczak ............. G06F 3/0393
(Continued)

FOREIGN PATENT DOCUMENTS

| JP | 5761773 B1 | 6/2015 |
|---|---|---|
| WO | 2017/044428 A1 | 3/2017 |
| WO | 2017/110338 A1 | 6/2017 |

OTHER PUBLICATIONS

International Search Report, dated Jul. 23, 2019, for International Application No. PCT/JP2019/023986, 1 page.

*Primary Examiner* — Chun-Nan Lin
(74) *Attorney, Agent, or Firm* — Seed IP Law Group LLP

(57) ABSTRACT

An electronic pen includes a cylindrical housing including an opening on one end of the housing in an axial direction of the housing, a core body attached inside of the housing such that an end of the core body protrudes from the opening on the one end of the housing, and a signal generation circuit which, in operation, generates a signal that is transmitted from the core body. The core body includes a core rod that is conductive and a protection member. The core rod includes a front portion that protrudes from the opening on the one end of the housing, a back portion, and an intermediate portion between the front portion and the back portion. The intermediate portion has a tapered shape narrowing from the front portion toward the back portion. The core rod receives the signal from the signal generation circuit. The protection member covers a side surface of the intermediate portion of the core rod.

12 Claims, 5 Drawing Sheets

1 ELECTRONIC PEN (ACTIVE CAPACITIVE SYSTEM)

Related U.S. Application Data continuation of application No. PCT/JP2019/023986, filed on Jun. 18, 2019.

(51) Int. Cl.
  *G06F 3/041*  (2006.01)
  *G06F 3/044*  (2006.01)

(56) References Cited

U.S. PATENT DOCUMENTS

| | | | |
|---|---|---|---|
| 2016/0018912 A1* | 1/2016 | Kaneda | G06F 3/033 |
| | | | 345/179 |
| 2017/0102792 A1* | 4/2017 | Aoki | G06F 3/0383 |
| 2017/0108955 A1* | 4/2017 | Mao | G06F 3/03545 |
| 2018/0209818 A1* | 7/2018 | Miyazawa | G06F 3/046 |
| 2018/0267636 A1* | 9/2018 | Chiu | G06F 3/03545 |
| 2019/0155408 A1* | 5/2019 | Hou | G06F 3/03545 |
| 2019/0243473 A1* | 8/2019 | Katsurahira | G06F 3/0383 |
| 2021/0089146 A1* | 3/2021 | Hashimoto | G06F 3/0442 |
| 2021/0263613 A1* | 8/2021 | Hashimoto | G06F 3/04166 |

\* cited by examiner

EXTERNAL VIEW

CROSS SECTIONAL VIEW

BOTTOM VIEW

EXTERNAL VIEW

CROSS SECTIONAL VIEW

BOTTOM VIEW

ELECTRONIC PEN AND CORE BODY FOR ELECTRONIC PEN INCLUDING CONDUCTIVE CORE ROD AND PROTECTION MEMBER THAT COVERS CORE ROD

BACKGROUND

Technical Field

The disclosure relates to an electronic pen used as a position indicator for a position detection apparatus mounted on an information processing apparatus, such as a tablet PC (Personal Computer), and to a core body for the electronic pen used for the electronic pen.

Background Art

A position detection apparatus and a position indicator are used as input devices of various electronic devices, such as a high-performance phone terminal called a smartphone and a tablet PC (Personal Computer). The position indicator is generally formed in a pen shape and is called an electronic pen, a stylus, or the like. There are various systems for the position detection apparatus and the position indicator. In a case of an active electrostatic system (AES) among these, a signal from an oscillation circuit mounted on the electronic pen is transmitted (emitted) from a nib toward a position detection sensor of the position detection apparatus to indicate the position on the position detection sensor.

The position detection sensor used in the position detection apparatus of the active electrostatic system includes linear transparent electrodes arranged on a display screen of a display apparatus, such as an liquid crystal display (LCD), in an X-axis direction (horizontal direction) and a Y-axis direction (vertical direction) of the display screen. The position detection apparatus detects the position indicated by the electronic pen according to the position of the linear transparent electrode of the position detection sensor receiving the signal (electric field) emitted from the electronic pen.

In the case of the electronic pen of the active electrostatic system, the signal from the signal generation circuit mounted on the electronic pen is transmitted from the nib as described above. Therefore, the core body of the electronic pen of the active electrostatic system of the related art is a columnar rod-shaped body, and the entire core body is formed by a conductive material. In the case of the electronic pen of the related art, when the nib is moved after the electronic pen is tilted, there is a problem that a waving phenomenon occurs in a reception signal detected by the position detection apparatus so that the linear characteristics of the detected indicated position become poor. This is caused by the fact that the signal (electric field) from the signal generation circuit is emitted not only from the nib (front end portion) of the core body of the electronic pen, but also from the axis part of the core body.

That is, along with the movement of the electronic pen, the signal (electric field) emitted from the axis part of the core body is received by the linear transparent electrode of the position detection sensor. In this case, a strong signal is received when the axis part of the core body is on the transparent electrode, and a weak signal is received when the axis part is out of the transparent electrode. As a result, the waving phenomenon occurs in the reception signal received by the transparent electrode. This degrades the linear characteristics as detected characteristics of the indicated position when the electronic pen is tilted.

Therefore, to improve the linear characteristics as detected characteristics of the indicated position, the front end portion of the core body may be formed into a sphere, and the axis part can be formed as thin as possible in the core body of the electronic pen of the active electrostatic system as disclosed in Japanese Patent No. 5761773 (hereinafter, referred to as Patent Document 1). The front end position of the core body is a sphere, and the axis part is thin. Therefore, even if the electronic pen is tilted, there is almost no influence of the signal (electric field) emitted from the axis part, and only the nib of the sphere is independently involved in the emission of the signal (electric field). The range of reception signal does not extend, and excellent linear characteristics can be obtained.

A position detection system including the electronic pen and the position detection apparatus of the active electrostatic system may detect the tilt of the electronic pen and correct the parallax between the nib of the electronic pen and the indicated position of the display screen. That is, the indicated position on the display screen indicated by the nib of the electronic pen and the indicated position on the display screen detected by the position detection apparatus are misaligned in some cases. Therefore, if the tilt of the electronic pen can also be taken into account to bring the actual indicated position and the detected position into line with each other, the electronic pen becomes more useful. The tilt of the electronic pen is calculated based on the direction of the range of the reception signal at the time that the position detection sensor detects the signal (electric signal) emitted from the axis part of the core body when the electronic pen is tilted as described above.

In the case of using the electronic pen of the related art using the core body that is a columnar rod-shaped body and that is entirely formed by a conductive material, the linear characteristics of the detected indicated position become poor although the tilt of the electronic pen can easily be detected as described above. In the case of the electronic pen using the core body, in which the front end portion is a sphere and the axis part is thin, disclosed in the above-described Patent Document 1, the linear characteristics of the detected indicated position become favorable. However, the signal (electric field) cannot be sufficiently emitted from the axis part, and it is difficult to appropriately detect the tilt of the electronic pen.

To input information using the electronic pen, the nib of the electronic pen is moved after the nib is brought into direct contact with a position detection surface formed by providing a protection layer, such as tempered glass, on the position detection sensor, so as to write information on paper by pencil. As a result, the position detection apparatus can import, as digital data indicating handwriting, the position indicated by the electronic pen. In this case, what is called writing touch varies depending on the material of the core body of the electronic pen. Therefore, there is a demand for using softer material for the nib of the electronic pen to realize softer writing touch. However, the strength becomes a problem if softer material is used for the core body.

BRIEF SUMMARY

In view of the above, the disclosure relates to an electronic pen and a core body for the electronic pen, and objects of the disclosure are to appropriately detect a tilt of the electronic pen while favorably maintaining linear characteristics of an indicated position detected on a position detection apparatus side and to realize desirable writing touch.

To solve the problems, provided is an electronic pen including a cylindrical housing including an opening on one end in an axial direction of the housing, a core body attached inside of the housing such that an end of the core body protrudes from the opening on the one end of the housing, and a signal generation circuit which, in operation, generates a signal that is transmitted from the core body. The core body includes a core rod that is conductive, the core rod including a front portion that protrudes from the opening on the one end of the housing, a back portion, and an intermediate portion between the front portion and the back portion, the intermediate portion having a tapered shape narrowing from the front portion toward the back portion, the core rod receiving the signal from the signal generation circuit, and a protection member that covers a side surface of the intermediate portion of the core rod.

The electronic pen includes the housing, the core body, and the signal generation circuit. The core body is attached inside of the housing such that the front end portion in the axial direction protrudes from the opening portion of the housing, and the signal generation circuit generates the signal transmitted from the core body. The core body includes the core rod and the protection member. The core rod of the core body includes the front portion, the intermediate portion, and the back portion, and the intermediate portion has the tapered shape narrowing from the front end portion toward the back end portion. The shape of the core rod enables appropriate detection of a tilt of the electronic pen while favorably maintaining linear characteristics of an indicated position detected by a position detection apparatus. The protection member is provided so as to cover the side surface of the intermediate portion of the core rod. The protection member ensures sufficient strength of the core body even if the core rod is made of a soft material.

DETAILED DESCRIPTION

An embodiment of an electronic pen according to the disclosure will now be described with reference to the drawings. The electronic pen of the embodiment described below is an electronic pen of an active electrostatic system that transmits a signal from the electronic pen side and that detects an indicated position according to the position on a position detection sensor that has received the signal.

Configuration Example of Electronic Pen of Active Electrostatic System

Figure 1:
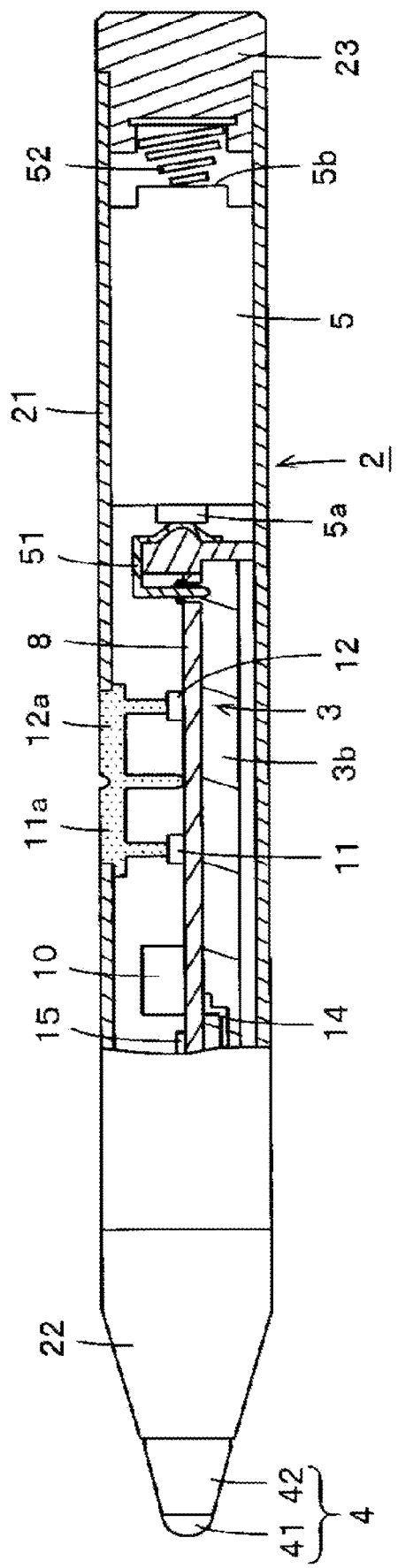
FIG. 1 is a diagram for describing a configuration example of an electronic pen according to an embodiment of the present disclosure.
Figure 2A:
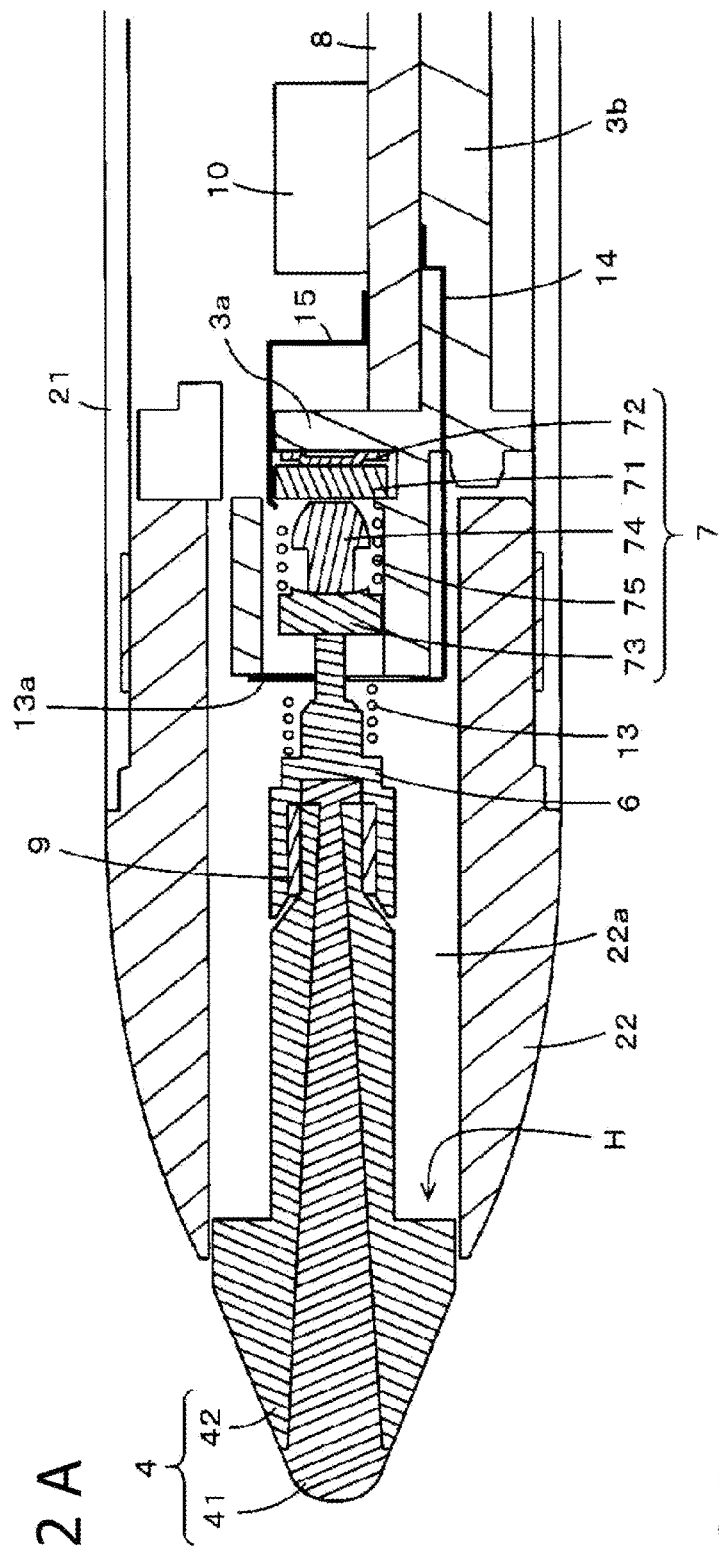
FIGS. 2A and 2B depict diagrams for describing main parts of the electronic pen according to the embodiment.
Figure 2B:
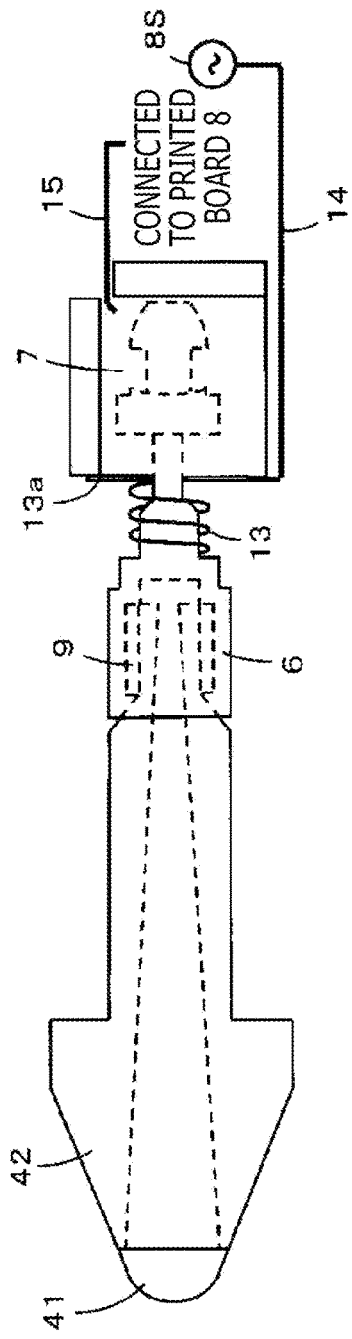

FIG. 1 is a diagram for describing a configuration example of an electronic pen 1 according to the embodiment, in which, for the description, part of a case (housing) 2 of the electronic pen 1 is cut to illustrate the inside of the electronic pen 1. FIGS. 2A and 2B depict diagrams for describing main parts of the electronic pen 1. Specifically, FIG. 2A is an enlarged cross-sectional view of main parts on the nib side of the electronic pen 1 not illustrated in FIG. 1. FIG. 2B schematically depicts extraction of a part for realizing functions of pen pressure detection and signal transmission in the electronic pen 1.

As illustrated in FIG. 1, the electronic pen 1 includes the case (housing) 2 in a cylindrical shape elongated in an axial direction (direction along an axis), in which one side in the axial direction is the nib side with an opening and the other side in the axial direction is closed. The case 2 is made of a conductive material, which is alumite-processed aluminum in the example. The case 2 includes a case body 21 in a cylindrical shape including a hollow portion inside, and a front cap 22 and a rear cap 23 combined with the case body 21. The front cap 22 and the rear cap 23 are fitted to the case body 21 to form the case 2.

The front cap 22 has a configuration of a cylindrical body including a through hole 22a in the axial direction as illustrated in FIG. 2A. The front cap 22 has a tapered shape, in which the outer diameter of the external shape of the part on the nib side of the electronic pen 1 gradually decreases toward the nib. An end portion on the nib side of the front cap 22 is an opening portion H of the through hole 22a. In a hollow portion of the case 2, a board holder 3 for holding mounted components, such as a printed circuit board 8, and a battery 5 are housed as illustrated in FIG. 1, and a core body holder (core body holding portion) 6 and pressure sensing components (pen pressure detection portions) 7 are housed as illustrated in FIG. 2A.

As illustrated in FIGS. 1 and 2A, a core body 4 is inserted into the through hole 22a through the opening portion H of the front cap 22 and is attached to the core body holder 6 inside of the case 2. The core body 4 can also be removed from the core body holder 6. That is, the core body 4 can be attached inside of the case 2 and detached from the case 2. The core body 4 includes a core rod 41 formed by a conductive material and a protection member 42 formed by a non-conductive material which will be described in detail later.

The board holder 3 is formed by an insulating resin, such as a liquid crystal polymer, and includes a pressure sensing component holding unit 3a and a printed circuit board placement portion 3b that continue in the axial direction of the electronic pen 1 when the board holder 3 is housed in the hollow portion of the case 2 as illustrated in FIG. 2A. The pressure sensing component holding unit 3a has a cylindrical shape including a hollow portion that houses the pressure sensing components 7 (a plurality of components for pen pressure detection), and the outer diameter of the pressure sensing component holding unit 3a is smaller than the inner diameter of the through hole 22a of the front cap 22. The printed circuit board placement portion 3b is a boat-shaped portion that places and holds the printed circuit board 8, and specifically, the printed circuit board placement portion 3b has a shape such that a cylindrical body is cut into substantially half in the axial direction.

The entire pressure sensing component holding unit 3a and the printed circuit board placement portion 3b are housed in the case 2 with the pressure sensing component holding unit 3a on the core rod 41 side, and the board holder 3 is fixed so that the board holder 3 does not move. As illustrated in FIG. 2A, the core body holder 6 that holds the core body 4 is combined with the pressure sensing component holding unit 3a of the board holder 3, and the pressure (pen pressure) mainly applied to the core rod 41 of the core body 4 is transmitted to the pressure sensing components 7 in the pressure sensing component holding unit 3a.

As illustrated in FIG. 1, a terminal conductor 51 is provided on an end portion of the printed circuit board placement portion 3b of the board holder 3 on the opposite side of the pressure sensing component holding unit 3a. The terminal conductor 51 is electrically abutted against a positive side terminal 5a of the battery 5 and is electrically connected to a copper foil pattern of a power line of the printed circuit board 8. A coil spring 52 made of conductive metal and electrically connected to a negative side terminal 5b of the battery 5 is provided at a portion fitted to the case body 21 of the rear cap 23. The battery 5 is inserted into the case 2 so as to connect the positive side terminal 5a to the terminal conductor 51 as illustrated in FIG. 1. Subsequently, the rear cap 23 is fitted to the case body 21 such that the coil spring terminal 52 presses the negative side terminal 5b of the battery 5.

In the embodiment, the case body 21 made of a conductive material is electrically connected to an earth conductor of the printed circuit board 8. The rear cap 23 and the case body 21 are made of a conductive material, and therefore, the negative side terminal 5b of the battery 5 is electrically connected to the earth conductor of the printed circuit board 8 through the rear cap 23 and the case body 21. On the other hand, the positive side terminal 5a of the battery 5 is connected to the copper foil pattern of the power line of the printed circuit board 8 through the terminal conductor 51. As a result, the voltage of the battery 5 is supplied as power voltage of a circuit formed on the printed circuit board 8.

A signal generation circuit 8S, an integrated circuit (IC) 10, and a circuit portion including peripheral circuit components of the IC 10 are provided on the printed circuit board 8. The signal generation circuit 8S generates a signal transmitted from the core rod 41 of the electronic pen 1. The IC 10 provides a control circuit that controls transmission of the signal from the signal generation circuit 8S to the core rod 41. The peripheral circuit portion includes push switches (side switches) 11 and 12. A conductor terminal member 14 that connects the core rod 41 and the signal generation circuit 8S and a conductor terminal member 15 that transmits the detected output of the pen pressure from the pressure sensing components 7 are connected to the printed circuit board 8.

The core body 4 is fitted to the core body holder 6 made of a conductive material through a conductive elastic member 9 and is combined with and held by the core body holder 6 as illustrated in FIG. 2A. The core body holder 6 is fitted to a holding member 73 of the pressure sensing components 7 in the pressure sensing component holding unit 3a of the board holder 3, and the pressure (pen pressure) applied to the core body 4 is transmitted to the pressure sensing components 7.

In this case, the core body holder 6 is always urged, toward the core rod 41 with respect to the board holder 3, by a coil spring 13 as an example of an elastic member made of a conductive material, such as conductive metal, provided between the core body holder 6 and the board holder 3. Note that, along with the conductor terminal member 14, the coil spring 13 provides an electrical connection member for transmitting, to the core rod 41, the signal from the signal generation circuit 8S, in which the transmission of the signal is controlled by the IC 10 arranged on the printed circuit board 8. Therefore, a metal plate 13a is provided on an end portion on the nib side of the pressure sensing component holding unit 3a of the board holder 3 to electrically connect the coil spring 13 and the conductor terminal member 14.

That is, as illustrated in FIG. 2B, the signal from the signal generation circuit 8S goes through the conductor terminal member 14, the metal plate 13a, the coil spring 13, the core body holder 6, and the core rod 41, in this order, and is transmitted from the core rod 41. The conductor terminal member 14, the coil spring 13, the metal plate 13a, the core body holder 6, and the core rod 41 provide an electrical connection member and form a transmission route of the position indication signal from the signal generation circuit 8S of the printed circuit board 8.

The pressure sensing components (pen pressure detection portions) 7 of the embodiment are components in a case of using a variable capacitor in which the electrostatic capacity changes according to the pen pressure applied to the core rod 41. As illustrated in FIG. 2A, the pressure sensing components 7 include a plurality of components including a dielectric 71, a terminal member 72, the holding member 73, a conductive member 74, and an elastic member 75. The terminal member 72 is made of a conductive material and provides a first electrode of the variable capacitor including the pressure sensing components 7. The conductive member 74 is made of, for example, conductive rubber, and the elastic member 75 includes a coil spring made of a conductive material. The conductive member 74 and the elastic member 75 are electrically connected to provide a second electrode of the variable capacitor.

As a result, the electrostatic capacity of the variable capacitor formed between the terminal member 72 providing the first electrode and the conductive member 74 providing the second electrode changes according to the pressure applied to the core rod 41. The change in the electrostatic capacity of the variable capacitor is supplied from the pressure sensing components 7 to the IC 10 provided on the printed circuit board 8 through the conductor terminal member 15, and the pen pressure is detected by the IC 10.

That is, the core body 4 of the electronic pen 1 according to the embodiment is installed on the core body holder 6 and is movable in the axial direction inside of the case 2 as illustrated in FIG. 2A. As a result, the core body 4 is pushed into the inside of the case 2 according to the pen pressure applied by a user to the core rod 41, and accordingly, the core rod 41 and the core body holder 6 press the pressure sensing components 7 to allow detecting the pen pressure. When the pen pressure applied to the core rod 41 is released, the action of the coil spring 13 described above allows the core body holder 6 and the core body 4 to return to the initial state illustrated in FIG. 2A.

The IC 10 of the electronic pen 1 controls the position detection sensor to transmit a burst signal (position indication signal) for coordinate detection (position detection) corresponding to the signal from the signal generation circuit 8S. This allows the position detection sensor side to detect the position indicated by the electronic pen 1 on the position detection sensor. The circuit including the IC 10 provided on the printed circuit board 8 of the electronic pen 1 further executes an action for the pressure sensing components 7 to detect the pen pressure based on the electrostatic capacity in the period of transmitting the burst signal. After the end of the transmission period of the burst signal, the IC 10 transmits, from the core rod 41, an encoded signal obtained by modulating the signal from the signal generation circuit 8S according to the detected pen pressure, to notify the position detection sensor side of the pen pressure. This allows the position detection sensor side to detect the pen pressure applied to the core body 4 of the electronic pen 1.

In this way, the electronic pen 1 of the embodiment realizes a function of indicating the position on the position detection sensor to the position detection sensor, detecting the pen pressure applied to the core rod 41, and notifying the position detection sensor of the pen pressure. Further, the electronic pen 1 of the embodiment has a feature in the configuration of the core body 4 so that the position detection sensor side can appropriately detect the tilt of the electronic pen 1, while the linear characteristics regarding the position detection are favorably maintained.

Configuration Example of Core Body 4

Figure 3A:
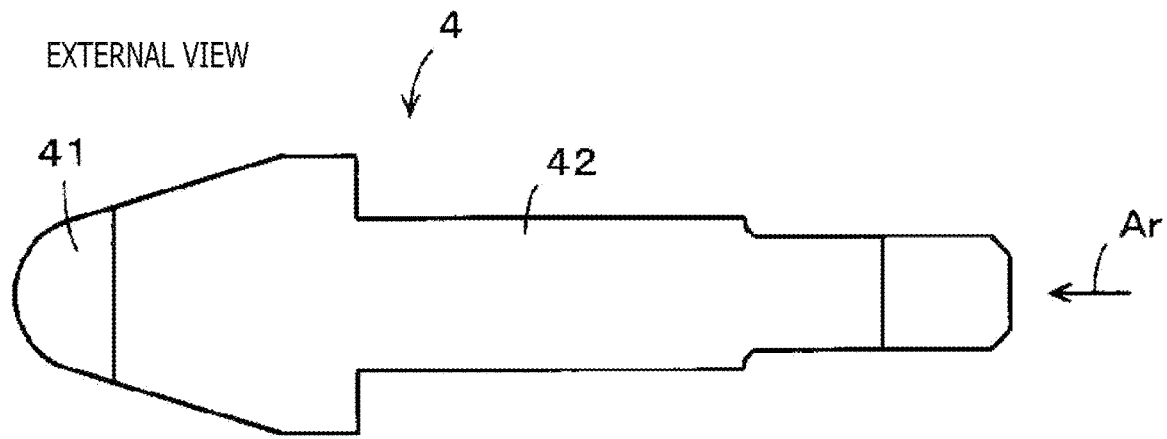
FIGS. 3A, 3B, and 3C depict diagrams for describing a configuration example of a core body of the electronic pen according to the embodiment.
Figure 3B:
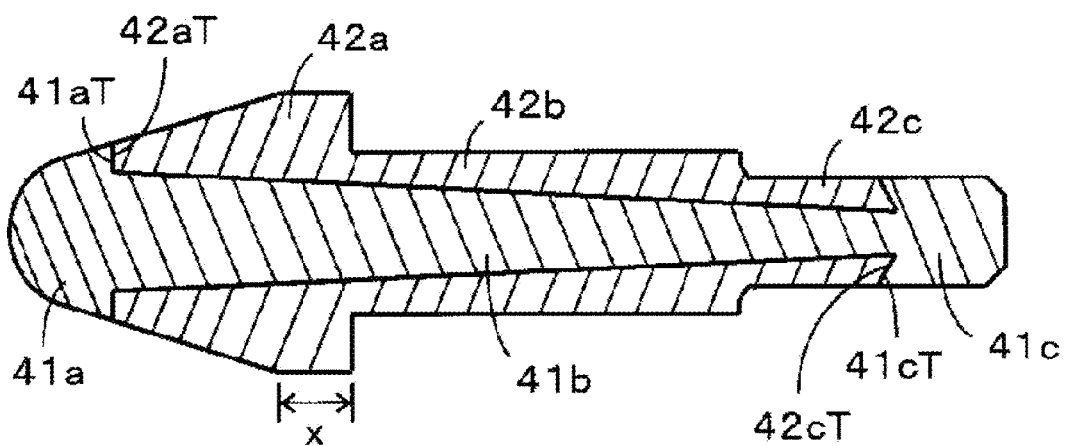
Figure 3C:
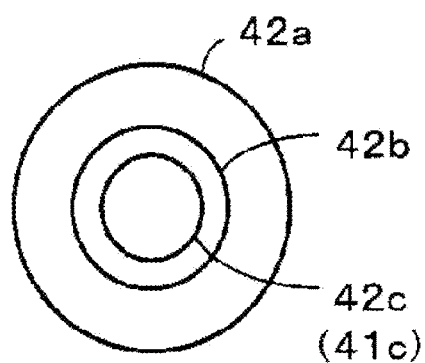

FIGS. 3A, 3B, and 3C depict diagrams for describing a configuration example of the core body 4 of the electronic pen 1. FIG. 3A illustrates an external view of the core body 4, FIG. 3B illustrates a cross-sectional view of the core body 4, and FIG. 3C illustrates a bottom view of the core body 4. The core body 4 includes the core rod 41 and the protection member 42 as described above and as also illustrated in FIGS. 3A and 3B. The core rod 41 is a conductive rod-shaped body. In the embodiment, a conductive elastomer is used to form the core rod 41. The conductive elastomer is rubber in which conductive particles (such as carbon, metal powder, and metal deposition powder) are substantially uniformly mixed with highly insulating rubber material at a certain blending ratio to thereby provide conductivity. Therefore, the core rod 41 is elastic and soft, realizing a nib with soft writing touch.

The core rod 41 includes a hemispherical front end portion 41a protruding from a front end side of the protection member 42 to form the nib and a back end portion 41c protruding from a back end side of the protection member 42 to form an electrical connection portion as illustrated in FIG. 3B. A rod-shaped part connecting the front end portion 41a and the back end portion 41c is an intermediate portion 41b. The intermediate portion 41b has a tapered shape narrowing from the front end portion 41a toward the back end portion 41c.

The protection member 42 covers a side surface of the intermediate portion 41b excluding the front end portion 41a and the back end portion 41c of the core rod 41, to protect the core rod 41 as illustrated in FIGS. 3A and 3B. In the embodiment, the protection member 42 is formed by polycarbonate. Polycarbonate is a type of thermoreversible plastic. Polycarbonate is softened by heat to allow molding into a desirable shape and is solidified by cooling.

Therefore, to form the core body 4, the core rod 41 is first molded by using a conductive elastomer as a material. Polycarbonate is then injected into the same mold over the core rod 41 (primary side) to form the protection member 42 (secondary side). This molding that is generally called two-color molding can be used to form the core body 4 provided with the protection member 42 on the side surface of the intermediate portion 41b of the core rod 41. Note that the two-color molding is a molding method of a member that is also called dissimilar material molding or double molding. The protection member 42 includes three parts with different widths in a direction crossing the axial direction, that is, a first protection portion 42a, a second protection portion 42b, and a third protection portion 42c, as illustrated in FIG. 3B.

The first protection portion 42a is a part provided on the nib side of the core body 4 as illustrated in FIG. 3B. The first protection portion 42a has a tapered shape narrowing toward the nib, and the width of the core body 4 in the direction crossing the axial direction is widest at the part of a predetermined range x from a back end of the first protection portion 42a toward the nib. However, the width in the direction crossing the axial direction at the part of the predetermined rage x is slightly shorter than the width (diameter) of the opening portion H of the front cap 22. As a result, the core body 4 can be inserted from the opening portion H of the front cap 22 and installed in the case 2 without being obstructed by the first protection portion 42a.

When the electronic pen 1 provided with the core body 4 in the case 2 is used for writing operation, the pen pressure is applied to the core rod 41 in the axial direction, and force is also applied in the direction opposite the movement direction of the electronic pen 1. When the force is large, an inner wall of the opening portion H of the front cap 22 and an outer wall of the predetermined range x of the first protection portion 42a in the protection member 42 of the core body 4 come into contact with each other. This can prevent an excessive load from being imposed on the core rod 41 in the writing operation. This prevents the core rod 41 from being excessively bent so that the writing becomes difficult and prevents the core rod 41 from being damaged.

The second protection portion 42b is a part continued from the back end side of the first protection portion 42a, and the width in the direction crossing the axial direction is shorter than the width of the back end of the first protection portion 42a but wider than the width of the third protection portion 42c in the direction crossing the axial direction described later. Therefore, the core body 4 includes three parts with different diameters as viewed in a direction indicated by an arrow Ar of FIG. 3A as illustrated in the bottom view of FIG. 3C. As for the relation between the diameters of the protection portions, the first protection portion 42a is the longest. The second protection portion 42b is the second longest, and the third protection portion 42c is the shortest. The second protection portion 42b protects the middle part of the intermediate portion 41b of the core rod 41 in the axial direction.

The third protection portion 42c is a part continued from a back end side of the second protection portion 42b and protects the thinnest part of the core rod 41. The width of the third protection portion 42c in the direction crossing the axial direction is substantially the same as the width of the back end portion 41c of the core rod 41 in the direction crossing the axial direction as illustrated in FIGS. 3B and 3C. The third protection portion 42c of the protection member 42 and the back end portion 41c of the core rod 41 are inserted into the part of the core body holder 6 formed in the cup shape and held as illustrated in FIG. 2A.

Therefore, the width of the third protection portion 42c of the protection member 42 and the back end portion 41c of the core rod 41 in the direction crossing the axial direction is slightly wider than the diameter of the part provided with the conductive elastic member 9 inside of the part where the core body holder 6 is formed in the cup shape. As a result, once the third protection portion 42c of the protection member 42 of the core body 4 and the back end portion 41c of the core rod 41 are inserted into the part of the core body holder 6 formed in the cup shape, the conductive elastic member 9 tightens and holds the circumferences of the parts. Therefore, the core body 4 can be attached in the case 2 after the core body 4 is prevented from being easily removed from the core body holder 6.

The core rod 41 of the core body 4 according to the embodiment is formed by a conductive elastomer (conductive rubber) as also described above and is elastic and soft. However, the side surface of the intermediate portion 41b of the core rod 41 is covered by the protection member 42 formed by polycarbonate. This can firmly protect the intermediate portion 41b that constitutes most of the core rod 41 in the axial direction. Particularly, the first protection portion 42a can significantly reduce the load imposed on the core rod 41 during writing. When the core body 4 is installed on the core body holder 6, the conductive elastic member 9 tightens and holds the circumference of the third protection portion 42*c*. Therefore, the core body 4 can be appropriately installed on the core body holder 6 such that the core body 4 cannot be easily removed.

The front end portion 41*a* of the core rod 41 protrudes from the protection member 42, and therefore, the front end portion 41*a* of the core rod 41 can provide the nib to realize an electronic pen with soft writing touch as also described above. The back end portion 41*c* of the core rod 41 also protrudes from the protection member 42. The back end portion 41*c* comes into contact with a bottom surface of the cup portion of the core body holder 6 formed by a conductive material and with the conductive elastic member 9 and can receive the signal from the signal generation circuit 8S. That is, the back end portion 41*c* of the core rod 41 provides an electrical connection end that receives the signal from the signal generation circuit 8S as also described above. As a result, the signal from the signal generation circuit 8S formed by the control of the IC 10 can be transmitted toward the position detection sensor through the core rod 41.

The intermediate portion 41*b* of the core rod 41 has a tapered shape thick on the front end portion 41*a* side and narrowing toward the back end portion 41*c* as illustrated in FIG. 3B. The intermediate portion 41*b* provides the axis part of the core body 4. Therefore, when the electronic pen 1 is tilted and used, the level of the signal transmitted from the front end portion 41*a* side of the intermediate portion 41*b* is higher than the signal transmitted from the back end portion 41*c* side. Therefore, the position detection sensor side can appropriately detect the tilt of the electronic pen 1 according to the signal transmitted from the intermediate portion 41*b* of the core rod 41 of the electronic pen 1.

Moreover, the front end portion 41*a* providing the nib is a relatively large hemispherical part projecting from the intermediate portion 41*b* toward the front end in the axial direction and projecting in the direction crossing the axial direction as illustrated in FIGS. 3A and 3B. Therefore, the front end portion 41*a* can transmit a signal with a relatively large signal level toward the position detection sensor without being affected by the signal transmitted from the intermediate portion 41*b*. As a result, the position indicated by the electronic pen 1 can always be appropriately detected based on the signal transmitted from the front end portion 41*a* without degrading the linear characteristics of the indicated position detected by the position detection apparatus that detects the indicated position.

As illustrated in FIG. 3B, a back end surface 41*a*T of the front end portion 41*a* of the core rod 41 and a front end surface 42*a*T of the first protection portion 42*a* of the protection member 42 are engaged with each other. Similarly, a front end surface 41*c*T of the back end portion 41*c* of the core rod 41 and a back end surface 42*c*T of the third protection portion 42*c* of the protection member 42 are engaged with each other. As a result, the position of the protection member 42 in the axial direction is fixed with respect to the core rod 41, and the protection member 42 is not shifted in the axial direction with respect to the core rod 41.

As illustrated in FIG. 3B, the angle toward the front end formed by the front end surface 41*c*T of the back end portion 41*c* of the core rod 41 as well as the back end surface 42*c*T of the third protection portion 42*c* of the protection member 42 and the axial direction is an acute angle. As a result, the end portion of the third protection portion 42*c* of the protection member 42 formed to have an acute angle is fitted into the acute angle part (groove part) formed by the intermediate portion 41*b* and the back end portion 41*c* of the core rod 41, and the core rod 41 and the protection member 42 can be firmly connected on the back end side.

Note that the material of the core rod 41 is not limited to the conductive elastomer. The core rod 41 can be formed by, for example, a resin, such as polyoxymethylene or polyacetal (POM) provided with conductive particles like metal powder or carbon, or felt provided with conductive material, such as conductive particles. In this way, the core rod 41 can be formed by various conductive materials. Moreover, relatively soft material, such as felt (non-woven), can be used to provide a nib with soft writing touch.

The material of the protection member 42 is not limited to polycarbonate. An acrylic resin called organic glass or the like can be used along with polycarbonate to form the protection member 42. In this way, various thermoreversible materials that can form the core rod 41 and the core body 4 by what is called double molding and that can protect the core rod 41 with some hardness in the solidified state can be used for the protection member 42.

Another Configuration Example of Core Body 4

Figure 4A:
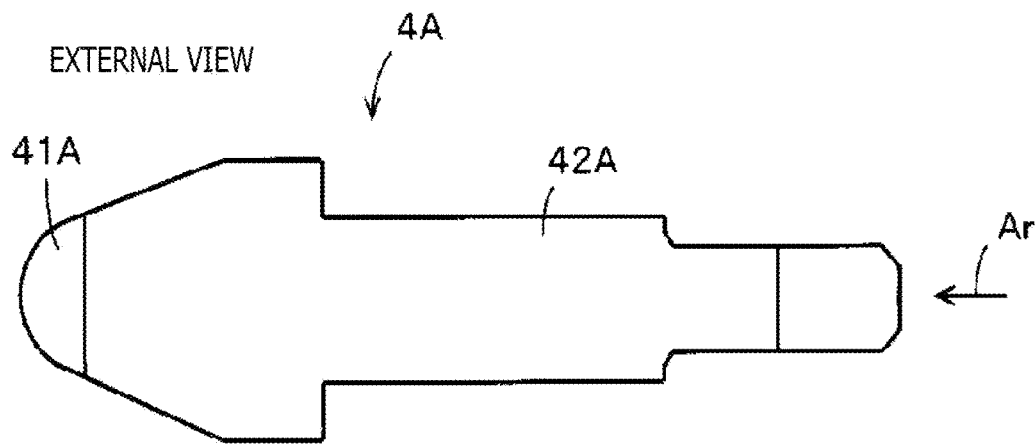
FIGS. 4A, 4B, and 4C depicts diagrams for describing another configuration example of the core body of the electronic pen according to the embodiment.
Figure 4B:
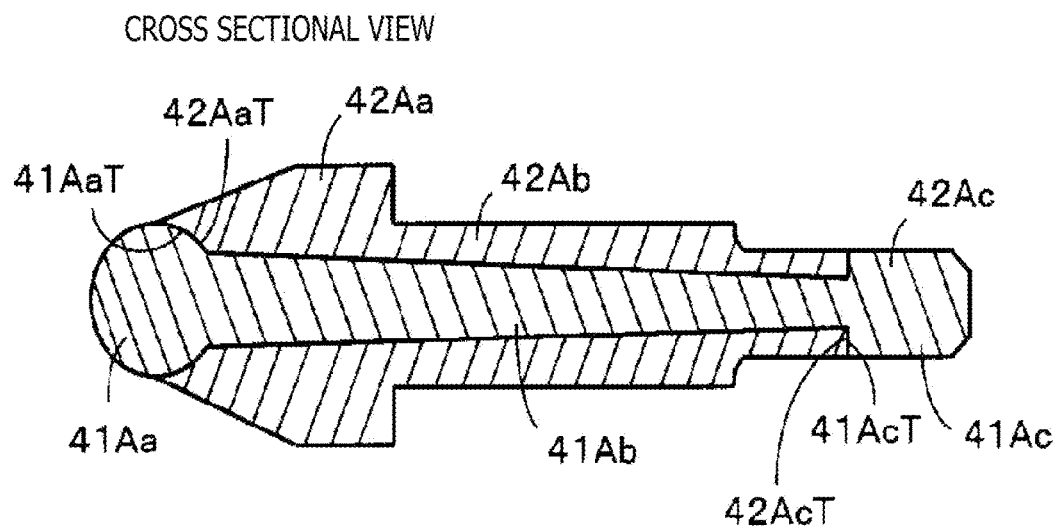
Figure 4C:
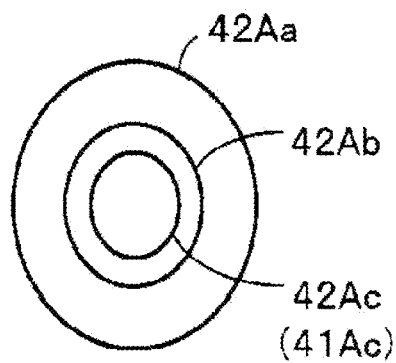

FIGS. 4A, 4B, and 4C depict diagrams for describing a core body 4A as one of other configuration examples of the core body 4 of the electronic pen 1. FIG. 4A illustrates an external view of the core body 4A, FIG. 4B illustrates a cross-sectional view of the core body 4A, and FIG. 4C illustrates a bottom view of the core body 4A. As illustrated in FIGS. 4A and 4B, the core body 4A of the example also includes a core rod 41A and a protection member 42A as in the case of the core body 4. The core rod 41A is formed with a conductive elastomer as a material as in the core rod 41 of the core body 4. The protection member 42A is formed with polycarbonate as a material as in the protection member 42 of the core body 4.

As can be understood by comparing FIGS. 4A and 3A, the appearances of the core body 4A of the example and the core body 4 are substantially the same. Therefore, the bottom view (FIG. 4C) as viewed from the arrow Ar side of FIG. 4A is substantially the same as the bottom view of the core body 4 illustrated in FIG. 3C. As can be understood by comparing FIG. 4B and FIG. 3B, the shape of the core rod 41A of the example and the shape of the core rod 41 are different. Accordingly, the shape of an inner wall surface of the protection member 42A of the example on the side in contact with the core rod 41A is different from the protection member 42.

That is, a front end portion 41Aa of the core rod 41A in the example is formed in a spherical shape, and this is significantly different from the core rod 41 including the front end portion 41*a* in a hemispherical shape described with reference to FIG. 3B. The core body 4A includes a back end portion 41Ac and an intermediate portion 41Ab in a tapered shape narrowing from the front end portion 41Aa toward the back end portion 41Ac. This is the same as in the case of the core body 4 described with reference to FIG. 3B. The protection member 42A includes a first protection portion 42Aa, a second protection portion 42Ab, and a third protection portion 42Ac, the portions being parts corresponding to the first protection portion 42*a*, the second protection portion 42*b*, and the third protection portion 42*c* of the protection member 42 of the core body 4.

However, as illustrated in FIG. 4B, a surface 41AaT on a back end side of the front end portion 41Aa of the core rod 41A and a corresponding inner wall surface 42AaT on a front end side of the first protection portion 42Aa of the protection member 42A are curves corresponding to each other, and the curves are engaged. In addition, a front end surface 41AcT of the back end portion 41Ac of the core rod 41A and a back end surface 42AcT of the third protection portion 42Ac of the protection member 42A are engaged. The front end surface 41AcT and the back end surface 42AcT are surfaces formed at substantially right angles to the axial direction. As a result, the position of the protection member 42A in the axial direction is also fixed with respect to the core rod 41A in the case of the core body 4A of the example, and this prevents the protection member 42A from being shifted in the axial direction with respect to the core rod 41A.

The case of the electronic pen 1A using the core body 4A illustrated in FIGS. 4A, 4B, and 4C can also obtain advantageous effects similar to those in the case of the electronic pen 1 using the core body 4 described with reference to FIG. 3. That is, an electronic pen with soft writing touch can be realized. The position detection sensor side can appropriately detect the tilt of the electronic pen 1 according to the signal transmitted from the intermediate portion 41Ab of the core rod 41A of the electronic pen 1A. The linear characteristics of the indicated position detected by the position detection apparatus that detects the indicated position are not degraded in the signal transmitted from the relatively large spherical front end portion 41Aa, and the position detection apparatus can always appropriately detect the position indicated by the electronic pen 1A.

The core rod 41A can also be formed by various conductive materials, such as POM and felt provided with conductivity using conductive particles, in the case of the core body 4A of the example. The protection member 42A can be formed by using various thermoreversible materials, such as an acrylic resin, that can form the core rod 41A and the core body 4A by what is called double molding and that can protect the core rod 41A with some hardness in the solidified state.

As described with reference to FIGS. 3 and 4, the core body for the electronic pen including the core rod and the protection member can be formed in various shapes. In this case, it is only necessary that the core rod include the front end portion, the back end portion, and the intermediate portion in a tapered shape narrowing from the front end portion toward the back end portion. Therefore, the front end portion and the back end portion can be in various shapes. It is only necessary that the protection member protect the intermediate portion of the core rod. More specifically, it is only necessary that the protection member include a first protection portion that protects the core body from the force applied in a direction opposite a movement direction during writing, a second protection portion that protects most of the intermediate portion, and a third protection portion that protects the back end portion side of the core rod and that forms a portion fitted to the core body holder 6.

Another Configuration Example of Electronic Pen

Figure 5:
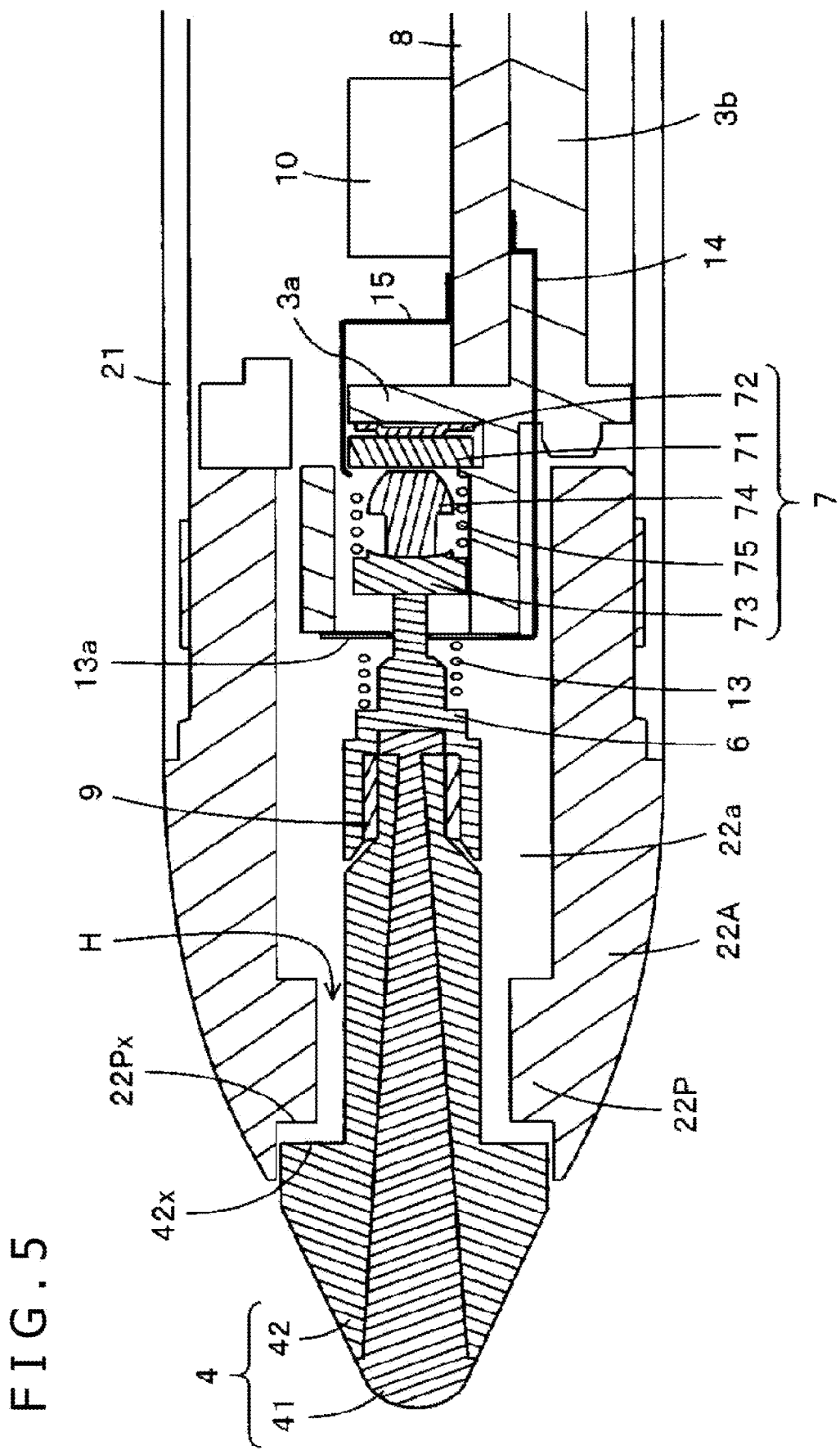
FIG. 5 is a diagram for describing another configuration example of the electronic pen according to the embodiment.

FIG. 5 is a diagram for describing another configuration example of the electronic pen. In FIG. 5, the same reference signs are provided to the parts configured similarly to the parts illustrated in FIG. 2A, and the details of the parts will not be repeatedly described. An electronic pen 1A illustrated in FIG. 5 can use the core bodies 4 and 4A described with reference to FIGS. 3 and 4. A case 2A of the electronic pen 1A includes three parts including a front cap 22A, the case body 21, and the rear cap 23 as in the electronic pen 1 described with reference to FIGS. 1 and 2. The internal structure of the front cap 22A of the electronic pen 1A in the example is partially different from the case of the electronic pen 1 described with reference to FIGS. 1 and 2.

That is, a protrusion 22P projecting in the axial direction from an inner wall on the nib side of the front cap 22A of the electronic pen 1A in the example to project in a ring shape on the inner wall is provided as illustrated in FIG. 5. A surface 22Px on the nib side of the protrusion 22P faces a back end surface 42x of the first protection portion 42a of the protection member 42 of the core body 4. As a result, when the core body 4 is pushed in the axial direction, the back end surface 42x of the first protection portion 42a of the protection member 42 and the surface 22Px on the nib side of the protrusion 22P are engaged with each other, and this can prevent the core body 4 from being pushed inside of the case 2A more than necessary.

Therefore, even if strong force is applied to the core body 4A of the electronic pen 1A in the axial direction, such as when the core body 4 of the electronic pen 1A is dropped down, the protrusion 22P can prevent the core body 4 from being pushed inside of the case 2A more than necessary. This can prevent the core body 4 from being damaged and prevent the pressure sensing components 7 for detecting the pen pressure from being damaged.

Advantageous Effects of Embodiment

According to the electronic pens of the embodiment described above, the core bodies 4 and 4A including the core rods 41 and 41A including the front end portions 41a and 41Aa, the intermediate portions 41b and 41Ab in the tapered shape, and the back end portions 41c and 41Ac are used to form the electronic pens 1 and 1A. The position indication signals can be transmitted at desirable levels from the front end portions 41a and 41Aa and the intermediate portions 41b and 41Ab of the core rods 41 and 41A. This can realize an electronic pen that can appropriately detect the tilt of the electronic pen while favorably maintaining the linear characteristics of the indicated position on the position detection apparatus side.

The side surfaces of the intermediate portions 41b and 41Ab of the core rods 41 and 41A are protected by the protection members 42 and 42A. The protection members 42 and 42A include the first protection portions 42a and 42Aa, the second protection portions 42b and 42Ab, and the third protection portions 42c and 42Ac. The functions of the first protection portions 42a and 42Aa can protect the core rods 41 and 41A from the force applied to the core rods 41 and 41A during writing. The second protection portions 42b and 42Ab and the third protection portions 42c and 42Ac protect the intermediate portions 41b and 41Ab of the core rods 41 and 41A. The functions of the third protection portions 42c and 42Ac can firmly install the core bodies 4 and 4A on the core body holder 6.

The protection members 42 and 42A are formed by using, for example, polycarbonate. The protection members 42 and 42A can be softened by heat and molded into desirable shapes, and the protection members 42 and 42A can be solidified by cooling. Therefore, the protection members 42 and 42A can be installed in close contact with the core rods 41 and 41A and can also be solidified. Even if the core rods 41 and 41A are relatively soft rods, such as conductive elastomers, the core rods 41 and 41A can be firmly protected. This can realize the core body 4 including a nib that realizes soft writing touch and can realize an electronic pen using the core body 4.

Modifications

Note that the front end portion 41a of the core rod 41 illustrated in FIG. 3B is hemispherical, and the front end portion 41Aa of the core rod 41A illustrated in FIG. 4B is spherical. However, the shapes of the front end portions of the core rods are not limited to these. The front end portions can be formed in various shapes according to the use of the electronic pen or the like. The degrees of tapering of the intermediate portions 41*b* and 41Ab of the core rods 41 and 41A can also be adjusted to various degrees. The sizes and the shapes of the back end portions 41*c* and 41Ac of the core rods 41 and 41A can also be adjusted to various sizes and shapes.

It is obvious that the core body 4 described with reference to FIGS. 3A, 3B, and 3C and the core body 4A described with reference to FIGS. 4A, 4B, and 4C can be formed and independently distributed as replaceable core bodies. The core rods 41 and 41A of the core bodies 4 and 4A are formed by relatively soft material, such as a conductive elastomer, and therefore, when the front end portions 41*a* and 41Aa are degraded, the core bodies 4 and 4A can be replaced to restore the original writing touch of the electronic pen.

It is also obvious that, if the writing touch of the nib does not have to be soft, various conductive resins can be used to form the core rods 41 and 41A. That is, a core body with a hard nib can also be provided. In this case, the position detection apparatus side can also favorably detect the tilt of the electronic pen, and an electronic pen with excellent linear characteristics of indicated position can also be realized.

It is to be noted that the embodiment of the present disclosure is not limited to the foregoing embodiment, and that various changes can be made without departing from the spirit of the present disclosure.

What is claimed is:

1. An electronic pen comprising:
a cylindrical housing including an opening on one end of the housing in an axial direction of the housing;
a core body attached inside of the housing such that an end of the core body protrudes from the opening on the one end of the housing; and
a signal generation circuit which, in operation, generates a signal that is transmitted from the core body,
wherein:
the core body includes a core rod that is conductive,
the core rod includes:
a front portion that protrudes from the opening on the one end of the housing,
a back portion, and
an intermediate portion between the front portion and the back portion,
the intermediate portion has a tapered shape that continuously narrows from an end of the intermediate portion that protrudes from the opening on the one end of the housing toward an end of the intermediate portion that is disposed inside of the housing,
the core rod receives the signal from the signal generation circuit, and
the core body includes a protection member that covers the core rod.

2. The electronic pen according to claim 1, further comprising:
a core body holding portion provided with the core body inside of the housing,
wherein the protection member of the core body includes:
a first protection portion that covers the front portion of the core rod,
a second protection portion that covers the intermediate portion of the core rod excluding a part of the intermediate portion of the core rod that is adjacent to the back portion of the core rod, and
a third protection portion that covers the part of the intermediate portion of the core rod that is adjacent to the back portion of the core rod and that forms a portion fitted to the core body holding portion.

3. The electronic pen according to claim 2, wherein:
a maximum width of an end surface on a back end of the first protection portion in a direction crossing the axial direction is wider than a maximum width of an end surface on a front end of the second protection portion in the direction crossing the axial direction, and
a maximum width of an end surface on a back end of the second protection portion in the direction crossing the axial direction is wider than a maximum width of an end surface on a front end of the third protection portion in the direction crossing the axial direction.

4. The electronic pen according to claim 1, wherein:
the core rod and the protection member are formed by different materials, and
the core rod is formed by a material that is softer than a material of the protection member.

5. The electronic pen according to claim 4, wherein:
the material used to form the core rod is polyoxymethylene, felt, or an elastomer.

6. A core body for an electronic pen that includes a cylindrical housing with an opening on one end of the housing in an axial direction of the housing, the core body being configured to be attached inside of the housing such that an end of the core body protrudes from the opening on the one end of the housing, the core body comprising:
a core rod that is conductive; and
a protection member that covers the core rod,
wherein:
the core rod includes:
a front portion configured to protrude from the opening on the one end of the housing,
a back portion, and
an intermediate portion between the front portion and the back portion,
the intermediate portion has a tapered shape configured to continuously narrow from an end of the intermediate portion that protrudes from the opening on the one end of the housing toward an end of the intermediate portion that is disposed inside of the housing, and
the core rod is configured to receive a signal from a signal generation circuit provided inside of the housing.

7. The core body for the electronic pen according to claim 6, wherein:
a core body holding portion is provided inside of the housing, and
the protection member of the core body includes:
a first protection portion that covers the front portion of the core rod,
a second protection portion that covers the intermediate portion of the core rod excluding a part of the intermediate portion of the core rod that is adjacent to the back portion of the core rod, and
a third protection portion that covers the part of the intermediate portion of the core rod that is adjacent to the back portion of the core rod and that forms a portion configured to be fitted to the core body holding portion.

8. The core body for the electronic pen according to claim 7, wherein:
   a maximum width of an end surface on a back end of the first protection portion in a direction crossing the axial direction is wider than a maximum width of an end surface on a front end of the second protection portion in the direction crossing the axial direction; and
   a maximum width of an end surface on a back end of the second protection portion in the direction crossing the axial direction is wider than a maximum width of an end surface on a front end of the third protection portion in the direction crossing the axial direction.

9. The core body for the electronic pen according to claim 6, wherein:
   the core rod and the protection member are formed by different materials, and
   the core rod is formed by a material that is softer than a material of the protection member.

10. The core body for the electronic pen according to claim 9, wherein:
   the material used to form the core rod is polyoxymethylene, felt, or an elastomer.

11. The electronic pen according to claim 1, wherein, in a direction crossing the axial direction of the housing, a width of the end of the intermediate portion that protrudes from the opening on the one end of the housing is greater than a width of the end of the intermediate portion that is disposed inside of the housing.

12. The core body for the electronic pen according to claim 6, wherein, in a direction crossing the axial direction of the housing, a width of the end of the intermediate portion that protrudes from the opening on the one end of the housing is greater than a width of the end of the intermediate portion that is disposed inside of the housing.

\* \* \* \* \*